US011255456B2

(12) United States Patent
DeForge et al.

(10) Patent No.: US 11,255,456 B2
(45) Date of Patent: Feb. 22, 2022

(54) SOLENOID VALVE ARMATURES

(71) Applicant: Hamilton Sundstrand Corporation, Charlotte, NC (US)

(72) Inventors: Jasen DeForge, South Windsor, CT (US); Giacomo Mezzino, Turin (IT)

(73) Assignee: Hamilton Sundstrand Corporation, Charlotte, NC (US)

( * ) Notice: Subject to any disclaimer, the term of this patent is extended or adjusted under 35 U.S.C. 154(b) by 322 days.

(21) Appl. No.: 16/027,863

(22) Filed: Jul. 5, 2018

(65) Prior Publication Data

US 2020/0011446 A1    Jan. 9, 2020

(51) Int. Cl.
*F16K 31/06* (2006.01)
*H01F 7/08* (2006.01)
*H01F 7/16* (2006.01)

(52) U.S. Cl.
CPC ......... *F16K 31/0658* (2013.01); *H01F 7/081* (2013.01); *H01F 7/1607* (2013.01); *H01F 2007/086* (2013.01)

(58) Field of Classification Search
CPC .... F16K 31/0658; H01F 7/081; H01F 7/1607; H01F 2007/086
See application file for complete search history.

(56) References Cited

U.S. PATENT DOCUMENTS

| | | | | |
|---|---|---|---|---|
| 4,875,658 A * | 10/1989 | Asai | ...................... | H01F 7/1607 251/129.21 |
| 2007/0261736 A1* | 11/2007 | Larsson | .............. | F16K 31/0651 137/315.03 |
| 2016/0096224 A1* | 4/2016 | Demuth | .................. | B22F 10/20 419/53 |
| 2017/0182595 A1* | 6/2017 | Nelson | ............... | B23K 26/0676 |
| 2019/0134897 A1* | 5/2019 | Williams | .............. | B22F 1/0003 |

OTHER PUBLICATIONS

Heer et al., "Compositionally graded magnetic-nonmagnetic bimetallic structure using laser engineered net shaping", 2017, Materials Letters, vol. 216, pp. 16-19. (Year: 2017).*
Onuike et al., Additive manufacturing of Inconel 718—Copper alloy bimettalic structure using laser engineered new shaping (LENS TM), 2018, Additive Manufacturing 21 (2018) 133-140. (Year: 2018).*

* cited by examiner

*Primary Examiner* — Eric Keasel
(74) *Attorney, Agent, or Firm* — Locke Lord LLP; Joshua L. Jones; Scott D. Wofsy

(57) ABSTRACT

A solenoid valve includes a valve body defining a valve inlet and a valve outlet in fluid communication with one another by a flow path through the valve body. A magnetic coil is housed with the valve body. An armature within the valve body includes an actuation portion extending along a longitudinal axis, and a valve portion extending along the longitudinal axis and connected to the actuation portion by a transition portion. The actuation portion includes a first material, the valve portion includes a second material different from the first material, and the transition portion includes a gradient material blended from the first material to the second material in a direction from the actuation portion to the valve portion.

18 Claims, 2 Drawing Sheets

SOLENOID VALVE ARMATURES

BACKGROUND OF THE INVENTION

1. Field of the Invention

The present disclosure relates to solenoid valves, and more particularly to improvements in solenoid valve armatures, e.g., for longer life in harsh operating conditions.

2. Description of Related Art

Solenoid valve armatures are typically manufactured from ferromagnetic materials such as iron, or a magnetized steel. Coatings or additional components must be added to operate in harsher environments. This increases cost, time, and complexity of manufacturing these components.

The conventional techniques have been considered satisfactory for their intended purpose. However, there is an ever present need for improved solenoid valves. This disclosure provides a solution for this need.

SUMMARY OF THE INVENTION

A solenoid valve includes a valve body defining a valve inlet and a valve outlet in fluid communication with one another by a flow path through the valve body. A magnetic coil is housed with the valve body. An armature within the valve body includes an actuation portion extending along a longitudinal axis, and a valve portion extending along the longitudinal axis and connected to the actuation portion by a transition portion. The actuation portion includes a first material, the valve portion includes a second material different from the first material, and the transition portion includes a gradient material blended from the first material to the second material in a direction from the actuation portion to the valve portion.

The actuation portion of the armature can be axially within the magnetic coil. The valve portion of the armature can include a valve member in the flow path configured to close a valve opening at the inlet of the valve body. The valve member includes a sealing surface configured to seal a valve opening.

The actuation portion, valve portion, and transition portion can be a product made by a process of powder-fed or wire-fed directed energy deposition. The actuation portion, valve portion, and transition portion can be a product made by a process of additively manufacturing with a build direction growing along the longitudinal axis, wherein build material is varied from one of the first and second materials to the other while growing the transition portion.

The first material can have greater magnetic properties than does the second material. The first material can be ferromagnetic and the second material can be non-magnetic. The second material can have higher strength than does the first material, and/or the second material can have a higher corrosion resistance than does the first material. The second material can have higher material strength properties at elevated temperatures than does the first material.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
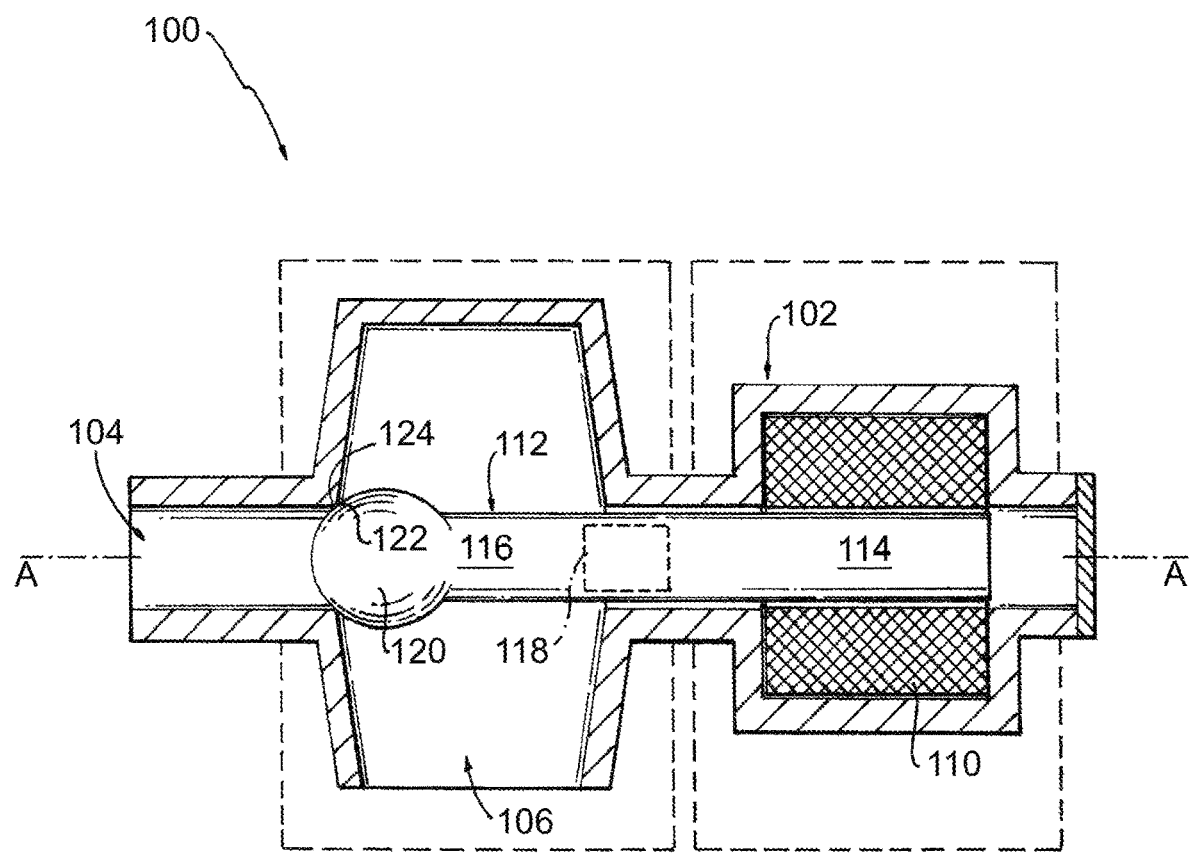
FIG. 1 is a schematic cross-sectional side elevation view of an exemplary embodiment of a solenoid valve constructed in accordance with the present disclosure, showing the armature in the closed valve position.

Reference will now be made to the drawings wherein like reference numerals identify similar structural features or aspects of the subject disclosure. For purposes of explanation and illustration, and not limitation, a partial view of an exemplary embodiment of a solenoid valve in accordance with the disclosure is shown in FIG. 1 and is designated generally by reference character 100. Other embodiments of solenoid valves in accordance with the disclosure, or aspects thereof, are provided in FIGS. 2-3, as will be described. The systems and methods described herein can be used to improve useable life time of solenoid armatures, e.g., when operating in harsh environments.

Figure 2:
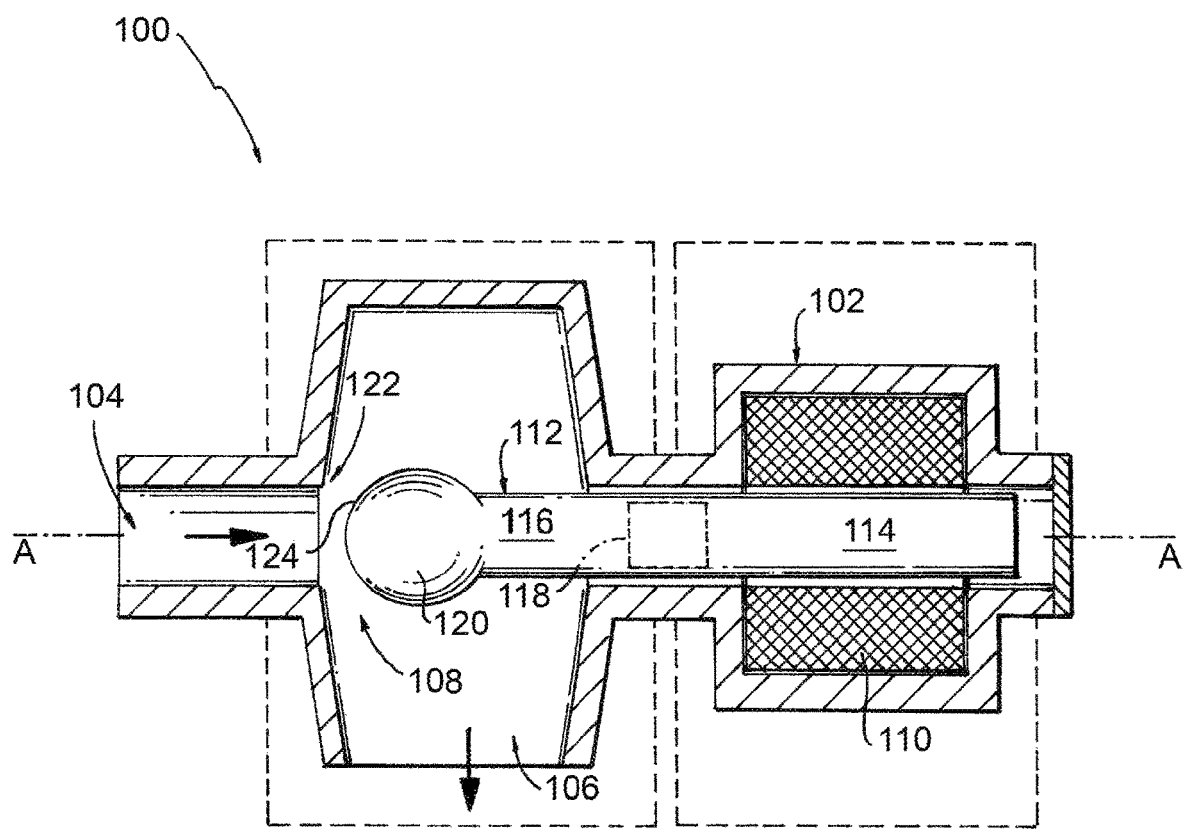
FIG. 2 is a schematic cross-sectional side elevation view of the solenoid valve of FIG. 1, showing the armature in the open valve position.

The solenoid valve 100 includes a valve body 102 defining a valve inlet 104 and a valve outlet 106 in fluid communication with one another by a flow path 108 through the valve body 102, i.e., when the solenoid valve 100 is in the open position shown in FIG. 2. A magnetic coil 110 is housed with the valve body 102. An armature 112 is included within the valve body 102, which can slide within the valve body 102 from the closed position shown in FIG. 1 to the open position shown in FIG. 2 and back.

Figure 3:
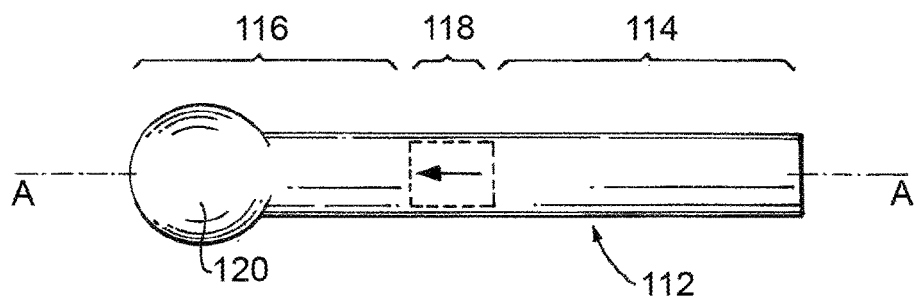
FIG. 3 is a schematic cross-sectional side elevation view of the armature of FIG. 1, showing the transition portion.

With reference to FIG. 3, the armature 112 includes an actuation portion 114 extending along a longitudinal axis A, and a valve portion 116 extending along the longitudinal axis A and connected to the actuation portion by a transition portion 118, which is indicated schematically in the drawings with a dashed line box. The actuation portion 114 includes a first material, the valve portion 116 includes a second material different from the first material, and the transition portion 118 includes a gradient material blended from the first material to the second material in a direction from the actuation portion 114 to the valve portion 116, i.e. in the direction of the large arrow in FIG. 3. The first material can have greater magnetic properties than does the second material. The first material can be ferromagnetic and the second material can be non-magnetic. The second material can have higher strength than does the first material, and/or the second material can have a higher corrosion resistance than does the first material. The second material can have higher material strength properties at elevated temperatures than does the first material.

With reference again to FIGS. 1-2, the actuation portion 114 is axially located within the magnetic coil 110. The valve portion 116 of the armature 112 includes a valve member 120 in the flow path 108 configured to close a valve opening 122 at the inlet 104 of the valve body 102. The valve member 120 includes a sealing surface 124 configured to seal a valve opening 122.

The actuation portion 114, valve portion 116, and transition portion 118 can be made by powder-fed or wire-fed directed energy deposition using a build direction growing along the longitudinal axis A, wherein build material is varied while growing the transition portion from the first material to the second material as the armature 112 is grown starting from the actuation portion 114 toward the valve portion 116, or vice versa if the build direction is reversed. It is also contemplated that powder blown deposition of magnetic material onto a non-magnetic substrate can be used to form the armature 112. The variation in materials while growing the transition portion 118 can be accomplished by using a mixture of feed stock powders of the first and second materials for an additive manufacture process, for example, and changing the proportion of each powder as the transition portion 118 is grown. Similar variations in feed stock can be used with wire-fed or powder blown processes.

Systems and methods as disclosed herein offer potential benefits including the following. Assembly time associated with existing solenoid core manufacturing methods can be reduced or eliminated. The number of piece parts required for assembly of an armature core can be reduced or eliminated. Coatings required for ferromagnetic alloys to operate in harsh environments can be eliminated. There can be an ability to manufacture gradient material cores for specific applications. There can be an ability to have multi-material high strength and magnetic properties in the same armature. There can be a reduced cost, time, and complexity of manufacture.

The methods and systems of the present disclosure, as described above and shown in the drawings, provide for solenoid valves with superior properties including ease of manufacture and improved useable life time relative to traditional solenoid valves. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A solenoid armature comprising:
an actuation portion extending along a longitudinal axis; and
valve portion extending along the longitudinal axis and connected to the actuation portion by a transition portion, wherein the actuation portion includes a first material, the valve portion includes a second material different from the first material, and wherein the transition portion includes a gradient material blended from the first material to the second material in a direction from the actuation portion to the valve portion, wherein the actuation portion, valve portion, and transition portion are a product made by a process of additively manufacturing with a build direction growing along the longitudinal axis, wherein build material is varied from one of the first and second materials to the other while growing the transition portion, wherein the proportion of each material changes as the transition portion is grown in the build direction along the longitudinal axis.

2. The solenoid armature as recited in claim 1, wherein the process of additively manufacturing includes powder-fed or wire-fed directed energy deposition.

3. The solenoid armature as recited in claim 1, wherein the first material has greater magnetic properties than does the second material.

4. The solenoid armature as recited in claim 1, wherein the first material is ferromagnetic and the second material is non-magnetic.

5. The solenoid armature as recited in claim 1, wherein the second material has higher strength than does the first material.

6. The solenoid armature as recited in claim 1, wherein the second material has higher material strength properties at elevated temperatures than does the first material.

7. The solenoid armature as recited in claim 1, wherein the second material has a higher corrosion resistance than does the first material.

8. The solenoid armature as recited in claim 1, wherein the valve portion includes a valve member configured to close a valve opening.

9. The solenoid armature as recited in claim 8, wherein the valve member includes a sealing surface configured to seal a valve opening.

10. A solenoid valve comprising:
a valve body defining a valve inlet and a valve outlet in fluid communication with one another by a flow path through the valve body;
a magnetic coil housed with the valve body; and
an armature within the valve body including:
an actuation portion extending along a longitudinal axis; and
valve portion extending along the longitudinal axis and connected to the actuation portion by a transition portion, wherein the actuation portion includes a first material, the valve portion includes a second material different from the first material, and wherein the transition portion includes a gradient material blended from the first material to the second material in a direction from the actuation portion to the valve portion, wherein the actuation portion, valve portion, and transition portion are a product made by a process of additively manufacturing with a build direction growing along the longitudinal axis, wherein build material is varied from one of the first and second materials to the other while growing the transition portion, wherein the proportion of each material changes as the transition portion is grown in the build direction along the longitudinal axis.

11. The solenoid valve as recited in claim 10, wherein the actuation portion of the armature is axially within the magnetic coil.

12. The solenoid valve as recited in claim 10, wherein the valve portion includes a valve member in the flow path configured to close a valve opening at the inlet of the valve body.

13. The solenoid valve as recited in claim 12, wherein the valve member includes a sealing surface configured to seal a valve opening.

14. The solenoid valve as recited in claim 10, wherein the process of additively manufacturing includes powder-fed or wire-fed directed energy deposition.

15. The solenoid valve as recited in claim 10, wherein the first material has greater magnetic properties than does the second material.

16. The solenoid valve as recited in claim 10, wherein the first material is ferromagnetic and the second material is non-magnetic.

17. The solenoid valve as recited in claim 10, wherein the second material has higher strength than does the first material, and/or wherein the second material has a higher corrosion resistance than does the first material.

18. The solenoid valve as recited in claim 10, wherein the second material has higher material strength properties at elevated temperatures than does the first material.

* * * * *